(12) United States Patent
Ichihashi

(10) Patent No.: US 9,359,937 B2
(45) Date of Patent: Jun. 7, 2016

(54) TWO-CYCLE ENGINE AND ENGINE TOOL COMPRISING THE SAME

(75) Inventor: Naoto Ichihashi, Hitachinaka (JP)

(73) Assignee: HITACHI KOKI CO., LTD., Tokyo (JP)

( * ) Notice: Subject to any disclaimer, the term of this patent is extended or adjusted under 35 U.S.C. 154(b) by 684 days.

(21) Appl. No.: 13/496,593

(22) PCT Filed: Mar. 18, 2011

(86) PCT No.: PCT/JP2011/001637
§ 371 (c)(1),
(2), (4) Date: Jun. 4, 2012

(87) PCT Pub. No.: WO2011/121930
PCT Pub. Date: Oct. 6, 2011

(65) Prior Publication Data
US 2013/0008681 A1    Jan. 10, 2013

(30) Foreign Application Priority Data

Mar. 31, 2010  (JP) .................. 2010-084056

(51) Int. Cl.
*F02B 25/00*   (2006.01)
*F02B 33/12*   (2006.01)
(Continued)

(52) U.S. Cl.
CPC .............. *F02B 33/12* (2013.01); *F02B 25/14* (2013.01); *F02B 33/28* (2013.01); *F02M 35/10262* (2013.01); *F02B 3/06* (2013.01);
(Continued)

(58) Field of Classification Search
CPC .............. F02B 2075/025; F02B 25/00; F02B 2700/037; F02B 3/06; F02B 25/14

USPC ......................................... 123/65 R
See application file for complete search history.

(56) References Cited

U.S. PATENT DOCUMENTS 5,440,215 A    8/1995  Gilmore
5,731,673 A    3/1998  Gilmore
(Continued)

FOREIGN PATENT DOCUMENTS

CN    2048256 U    11/1989
CN    1742427 A    3/2006
(Continued)

OTHER PUBLICATIONS

Chinese Office Action issued in Chinese Application No. 2011800108275 issued Mar. 28, 2014, with English Translation.
(Continued)

*Primary Examiner* — Lindsay Low
*Assistant Examiner* — Charles Brauch
(74) *Attorney, Agent, or Firm* — McDermott Will & Emery LLP

(57) ABSTRACT

The two-cycle engine comprises a first scavenging opening and second scavenging opening on the inner peripheral wall of a cylinder bore, and a first scavenging passage and second scavenging passage connecting the first scavenging opening and second scavenging opening to the crank chamber. The first and second scavenging passages are provided with an outflow direction change device directing the outflow of an air-fuel mixture flowing out from near the top dead center of the first and second scavenging openings into the cylinder bore and the outflow of the air-fuel mixture flowing out from near the bottom dead center of the first and second scavenging openings into the cylinder bore in different directions.

15 Claims, 19 Drawing Sheets

(51) Int. Cl.
  *F02B 25/14* (2006.01)
  *F02B 33/28* (2006.01)
  *F02M 35/10* (2006.01)
  *F02B 75/02* (2006.01)
  *F02B 3/06* (2006.01)
  *F02B 63/02* (2006.01)

(52) U.S. Cl.
  CPC ............... *F02B 25/00* (2013.01); *F02B 63/02* (2013.01); *F02B 2075/025* (2013.01); *F02B 2700/037* (2013.01); *Y02T 10/146* (2013.01)

(56) References Cited

U.S. PATENT DOCUMENTS

| | | | |
|---|---|---|---|
| 5,937,622 A | 8/1999 | Carrier et al. | |
| 6,170,241 B1 | 1/2001 | Shibilski et al. | |
| 6,367,432 B1 | 4/2002 | Araki | |
| 6,388,426 B1 | 5/2002 | Yokoo et al. | |
| 6,424,799 B1 | 7/2002 | Gilmore | |
| 6,836,614 B2 | 12/2004 | Gilmore | |
| 7,042,180 B2 | 5/2006 | Terry et al. | |
| 7,112,934 B2 | 9/2006 | Gilmore | |
| 7,135,791 B2 | 11/2006 | Kushida et al. | |
| 7,183,740 B2 | 2/2007 | Nakayama et al. | |
| 7,292,009 B2 | 11/2007 | Kawakami et al. | |
| 7,574,873 B2 | 8/2009 | Goto et al. | |
| 7,688,028 B2 | 3/2010 | Phillips et al. | |
| 7,697,826 B2 | 4/2010 | Reutlinger et al. | |
| 7,728,553 B2 | 6/2010 | Carrier et al. | |
| 2003/0096158 A1 | 5/2003 | Takano et al. | |
| 2003/0106509 A1* | 6/2003 | Uenoyama et al. | 123/73 PP |
| 2004/0244738 A1 | 12/2004 | Yuasa et al. | |
| 2004/0255883 A1 | 12/2004 | Yuasa et al. | |
| 2005/0057226 A1 | 3/2005 | Kawakami et al. | |
| 2005/0073282 A1 | 4/2005 | Carrier et al. | |
| 2006/0071643 A1 | 4/2006 | Carrier et al. | |
| 2006/0087283 A1 | 4/2006 | Phillips et al. | |
| 2006/0087286 A1 | 4/2006 | Phillips et al. | |
| 2006/0113934 A1 | 6/2006 | Kushida et al. | |
| 2006/0214642 A1 | 9/2006 | Miyazaki et al. | |
| 2006/0220605 A1 | 10/2006 | Funabashi et al. | |
| 2007/0028868 A1* | 2/2007 | Tsutsui | 123/73 PP |
| 2007/0126407 A1 | 6/2007 | Loong | |
| 2007/0247097 A1 | 10/2007 | Seiler et al. | |
| 2008/0238370 A1 | 10/2008 | Carrier et al. | |
| 2008/0251268 A1 | 10/2008 | Kushida | |
| 2008/0297080 A1 | 12/2008 | Bosch | |
| 2009/0160373 A1 | 6/2009 | Katou et al. | |
| 2009/0295313 A1 | 12/2009 | Suzuki et al. | |
| 2010/0037875 A1 | 2/2010 | Yasutomi et al. | |
| 2010/0037877 A1 | 2/2010 | Yasutomi et al. | |
| 2010/0084150 A1 | 4/2010 | Suzuki et al. | |
| 2010/0085010 A1 | 4/2010 | Suzuki et al. | |
| 2010/0141207 A1 | 6/2010 | Phillips et al. | |
| 2010/0213900 A1 | 8/2010 | Carrier et al. | |
| 2012/0091929 A1 | 4/2012 | Kusakawa | |
| 2012/0234573 A1 | 9/2012 | Suda et al. | |

FOREIGN PATENT DOCUMENTS

| | | |
|---|---|---|
| CN | 1757155 A | 4/2006 |
| CN | 100361384 C | 1/2008 |
| CN | 101447757 A | 6/2009 |
| JP | 62-003121 | 1/1987 |

OTHER PUBLICATIONS

W.J.D. Annand et al., "Gas Flow in the Internal Combustion Engines," G T Foulis 1974.

Office Action issued in Chinese Patent Application No. 201180006051.X dated Jan. 30, 2014.

Office Action issued in related U.S. Appl. No. 13/496,601, dated Jan. 28, 2014.

Office Action issued in U.S. Appl. No. 13/496,602 dated Feb. 10, 2014.

Communication pursuant to Article 94(3) EPC—EP Application No. 11 713 525.1 dated Jun. 18, 2015.

* cited by examiner

TWO-CYCLE ENGINE AND ENGINE TOOL COMPRISING THE SAME

RELATED APPLICATIONS

This application is the U.S. National Phase under 35 U.S.C. §371 of International Application No. PCT/JP2011/001637, filed on Mar. 18, 2011, which in turn claims the benefit of Japanese Application No. 2010-084056, filed on Mar. 31, 2010, the disclosures of which Applications are incorporated by reference herein.

TECHNICAL FIELD

This application relates generally to a two-cycle engine, and more particularly, to an internal combustion engine suitable for portable engine tools such as chain saws and mowers.

BACKGROUND

Lawn mowers, engine chain saws, engine head trimmers, and engine blowers are among traditionally known portable engine tools. These engine tools are essentially transportable or portable and importantly lightweight as much as possible. Therefore, two-cycle engines, which are simple in structure and lightweight, are used as their internal combustion engine. Generally, a portable engine tool carries a relatively small two-cycle engine of 75 cc displacement or smaller, preferably 50 cc displacement or smaller. In order to prevent the exhaust gas from deteriorating in characteristic values due to outflow of unburned gas (air-fuel mixture) from the exhaust passage during the scavenging process (short circuiting, or scavenging losses), some two-cycle engines have a restrictor in the scavenging passage to reduce short circuiting of the air-fuel mixture as in, for example, Patent Literature 1.

CITATION LIST

Patent Literature

PTL 1: Unexamined Japanese Patent Application KOKAI Publication No. S62-3121

SUMMARY

Technical Problem

The above engine having a restrictor in the scavenging passage reduces the short circuiting; however, the restrictor reduces the scavenging volume per cycle. This leads to problems such as reduction in the charging efficiency and then reduction in the engine output. Furthermore, a small two-cycle engine mounted on a portable engine tool has limitation on the layout and initial production cost, leading to problems such as difficulty in providing complex mechanisms.

Solution to Problem

The present invention is invented in view of the above problems and an exemplary object of the present invention is to provide a two-cycle engine having the output improved while reducing the short circuiting to prevent the exhaust gas from deteriorating in characteristic values. Another exemplary object of the present invention is to provide a portable engine tool carrying the above high output, inexpensive two-cycle engine.

In order to achieve the above objects, the two-cycle engine according to the present invention is characterized by comprising:

a cylinder block having a cylinder bore;

an exhaust opening and scavenging opening formed on the inner peripheral wall of the cylinder bore;

a scavenging passage extending in the direction of the axial line of the cylinder bore and connecting the scavenging opening and a crank chamber communicating with the cylinder bore; and an outflow direction change device provided in the scavenging passage for directing the outflow of an air-fuel mixture flowing out from near the top dead center of the scavenging opening into the cylinder bore and the outflow of the air-fuel mixture flowing out from near the bottom dead center of the scavenging opening into the cylinder bore in different directions when seen in the direction of the axial line of the cylinder bore.

Furthermore, possibly, the outflow direction change device directs the outflow of an air-fuel mixture flowing out from near the top dead center of the scavenging opening into the cylinder bore more toward the exhaust opening than the outflow of the air-fuel mixture flowing out from near the bottom dead center of the scavenging opening into the cylinder bore when seen in the direction of the axial line of the cylinder bore.

Furthermore, possibly, the scavenging opening is a pair of scavenging openings provided nearly symmetrically about the line connecting a point bisecting the exhaust opening in the circumferential direction when seen in the direction of the axial line of the cylinder bore and the axial line of the cylinder bore.

Furthermore, possibly, the scavenging opening is two pairs of scavenging openings provided apart from each other in the circumferential direction of the cylinder bore nearly symmetrically about the line connecting a point bisecting the exhaust opening in the circumferential direction when seen in the direction of the axial line of the cylinder bore and the axial line of the cylinder bore.

Furthermore, preferably, the scavenging passage has an axial line extending into the cylinder toward the opposite side of the cylinder bore to the exhaust opening when seen in the direction of the axial line of the cylinder bore.

Furthermore, possibly, a scavenging cover constituting a part of the scavenging passage is provided to the cylinder block, and the outflow direction change device is partly constituted by the scavenging cover.

Furthermore, possibly, the scavenging passage away from the exhaust opening when seen in the direction of the axial line of the cylinder bore is formed in the manner that the first extended line extending from the wall surface near the top dead center in the vicinity of the scavenging opening toward the cylinder bore extends at a first angle with respect to a plane perpendicular to the axial line of the cylinder bore so as to approach the top dead center; and the scavenging passage closer to the exhaust opening when seen in the direction of the axial line of the cylinder bore is formed in the manner that the second extended line extending from the wall surface near the top dead center in the vicinity of the scavenging opening toward the cylinder bore extends at a second angle smaller than the first angle with respect to a plane perpendicular to the axial line of the cylinder bore.

Furthermore, preferably, the scavenging passage consists of an upper scavenging passage connected to the scavenging opening and extending in the direction from the top dead center to the bottom dead center and a lower scavenging passage having a width larger than the width at the lower end of the upper scavenging passage in the circumferential direction of the cylinder bore when seen in the direction of the axial line of the cylinder bore, connected to the lower end of the upper scavenging passage, and extending toward the crank chamber, and the outflow direction change device is constituted by connecting the upper scavenging passage to the lower scavenging passage in the manner that the former is shifted with respect to the latter in the direction to the inside of the lower scavenging passage and away from the exhaust opening in the circumferential direction of the cylinder bore.

Furthermore, preferably, the upper and lower scavenging passages are connected in the manner that they form a step where the interior of the scavenging passages is changed stepwise.

Furthermore, possibly, the inner wall of the upper scavenging passage on the side away from the exhaust opening in the circumferential direction of the cylinder bore and the inner wall of the lower scavenging passage on the side away from the exhaust opening in the circumferential direction of the cylinder bore are connected in an overlapping manner when seen in the direction of the axial line of the cylinder bore.

Furthermore, possibly, the channel cross-sectional area of the upper scavenging passage near the connection point to the lower scavenging passage is smaller than the channel cross-sectional area of the lower scavenging passage near the connection point to the upper scavenging passage; and the channel cross-sectional area of the upper scavenging passage near the scavenging opening is smaller than the channel cross-sectional area of the upper scavenging passage near the connection point to the lower scavenging passage.

Furthermore, possibly, the upper and lower scavenging passages have nearly the same length in the direction of the axial line of the cylinder bore.

Furthermore, possibly, the outflow direction change device forms a flow of air-fuel mixture directed toward the exhaust opening near the top dead center of the scavenging passage in the vicinity of the scavenging opening and a flow of air-fuel mixture directed away from the exhaust opening near the bottom dead center of the scavenging passage in the vicinity of the scavenging opening.

Furthermore, preferably, the outflow direction change device comprises:

a first sidewall and second sidewall extending in the direction of the axial line of the cylinder bore near the top dead center of the scavenging passage in the vicinity of the scavenging opening and situated on the side closer to the exhaust opening and on the side away from the exhaust opening, respectively; and a third sidewall and fourth sidewall extending in the direction of the axial line of the cylinder bore near the bottom dead center of the scavenging passage in the vicinity of the scavenging opening and situated on the side closer to the exhaust opening and on the side away from the exhaust opening, respectively, when seen in the direction of the axial line of the cylinder bore, the third extended line extending from the first sidewall or second sidewall into the cylinder bore extends away from the exhaust opening and the fourth extended line extending from the third sidewall or fourth sidewall into the cylinder bore extends away from the exhaust opening, and the first, second, third, and fourth sidewalls are formed in the manner that the third angle between the third extended line and the line connecting a point bisecting the exhaust opening in the circumferential direction and the axial line of the cylinder bore is larger than the fourth angle between the fourth extended line and the line connecting a point bisecting the exhaust opening in the circumferential direction and the axial line of the cylinder bore.

Furthermore, possibly, when seen in the direction of the axial line of the cylinder bore, the lower end of the first and second sidewalls and the upper end of the third and fourth sidewalls are each situated nearly at the midpoint of the scavenging opening.

The two-cycle engine according to the second exemplary aspect of the present invention comprises:

a cylinder block having a cylinder bore;

an exhaust opening and scavenging opening formed on the inner peripheral wall of the cylinder bore; and a scavenging passage extending in the direction of the axial line of the cylinder bore, connecting the scavenging opening and a crank chamber communicating with the cylinder bore, and having an upper scavenging passage part connected to the scavenging opening and extending in the direction from the top dead center to the bottom dead center and a lower scavenging passage part having a width larger than the width at the lower end of the upper scavenging passage part in the circumferential direction of the cylinder bore when seen in the direction of the axial line of the cylinder bore, connected to the lower end of the upper scavenging passage part, and extending toward the crank chamber, wherein the upper scavenging passage part is connected to the lower scavenging passage part in an offset manner in the direction away from the exhaust opening in the circumferential direction of the cylinder bore.

The engine tool according to the third exemplary aspect of the present invention is characterized by comprising the above-described two-cycle engine.

Advantageous Effects of Invention

The two-cycle engine of the present invention has an outflow direction change device in the scavenging passage, the outflow direction change device directing the outflow of an air-fuel mixture flowing out from near the top dead center of the scavenging opening into the cylinder bore and the outflow of the air-fuel mixture flowing out from near the bottom dead center of the scavenging opening into the cylinder bore in different directions when seen in the direction of the axial line of the cylinder bore. Therefore, the flow of air-fuel mixture in the cylinder bore can be controlled to improve the output while reducing the short circuiting so as to prevent the exhaust gas from deteriorating in characteristic values.

BRIEF DESCRIPTION OF DRAWINGS

A more complete understanding of this application can be obtained when the following detailed description is considered in conjunction with the following drawings.

DESCRIPTION OF EMBODIMENTS

An embodiment of the present invention will be described hereafter with reference to the attached drawings. A chain saw 1001 carrying a two-cycle Schnurle type engine 1 (the engine hereafter) comprises an engine casing 1002 housing the engine 1, a guide bar 1004 protruding from the engine casing 1002 and guiding a saw chain 1003, and a front handle 1005 and main handle 1006 to be held by the operator. The output of the engine 1 is controlled by a throttle lever 1007 provided on the main handle 1006. Then, the output of the engine 1 is transferred to the saw chain 1003 via a known drive mechanism. Here, in an embodiment of the present invention, the two-cycle engine 1 mounted on the chain saw 1001 is a small two-cycle engine of 75 cc displacement or smaller, preferably 50 cc displacement or smaller.

Figure 1:
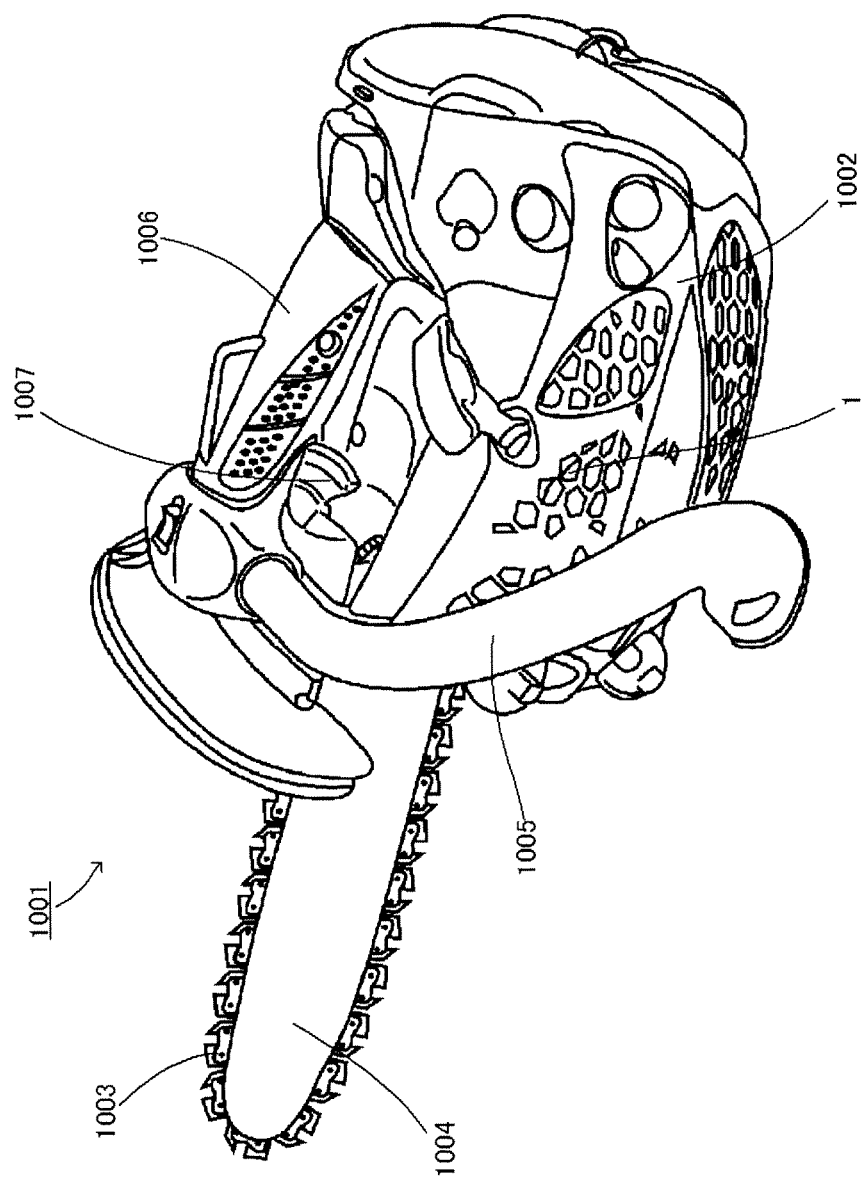
FIG. 1 is an illustration showing a chain saw on which the two-cycle engine of the present invention is mounted.
Figure 2:
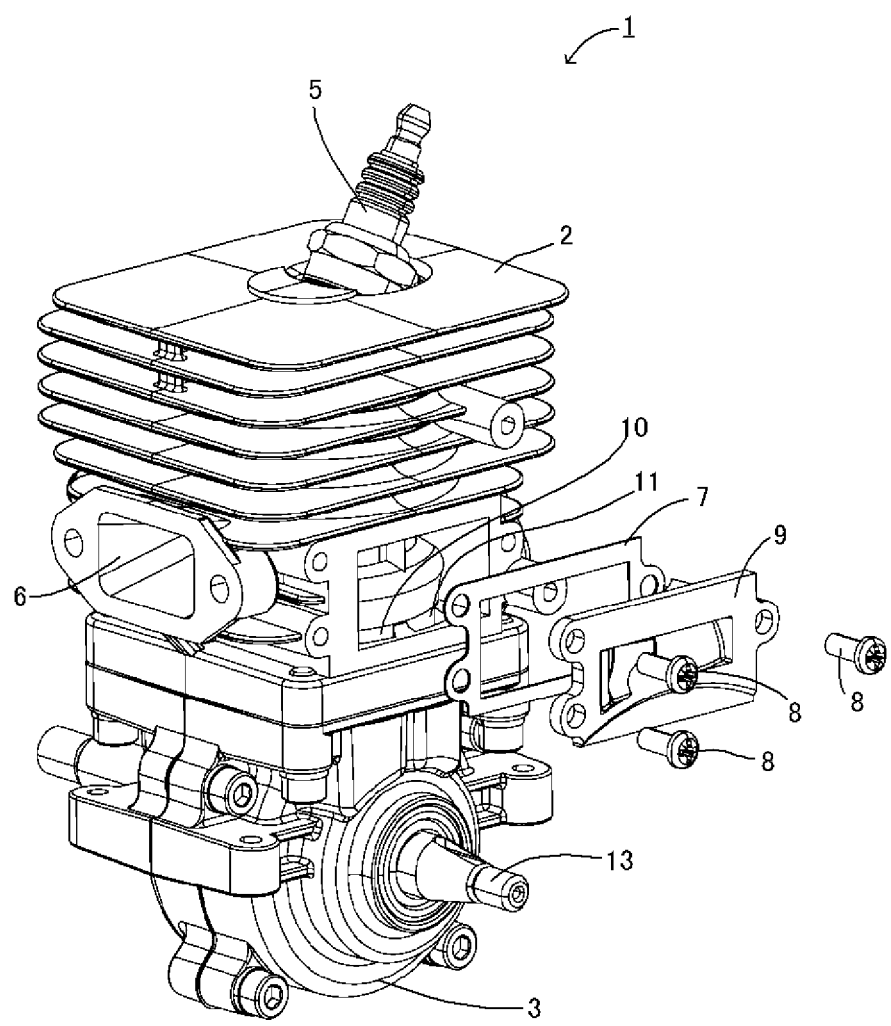
FIG. 2 is an exploded, perspective view of a part of the engine in FIG. 1.
Figure 3:
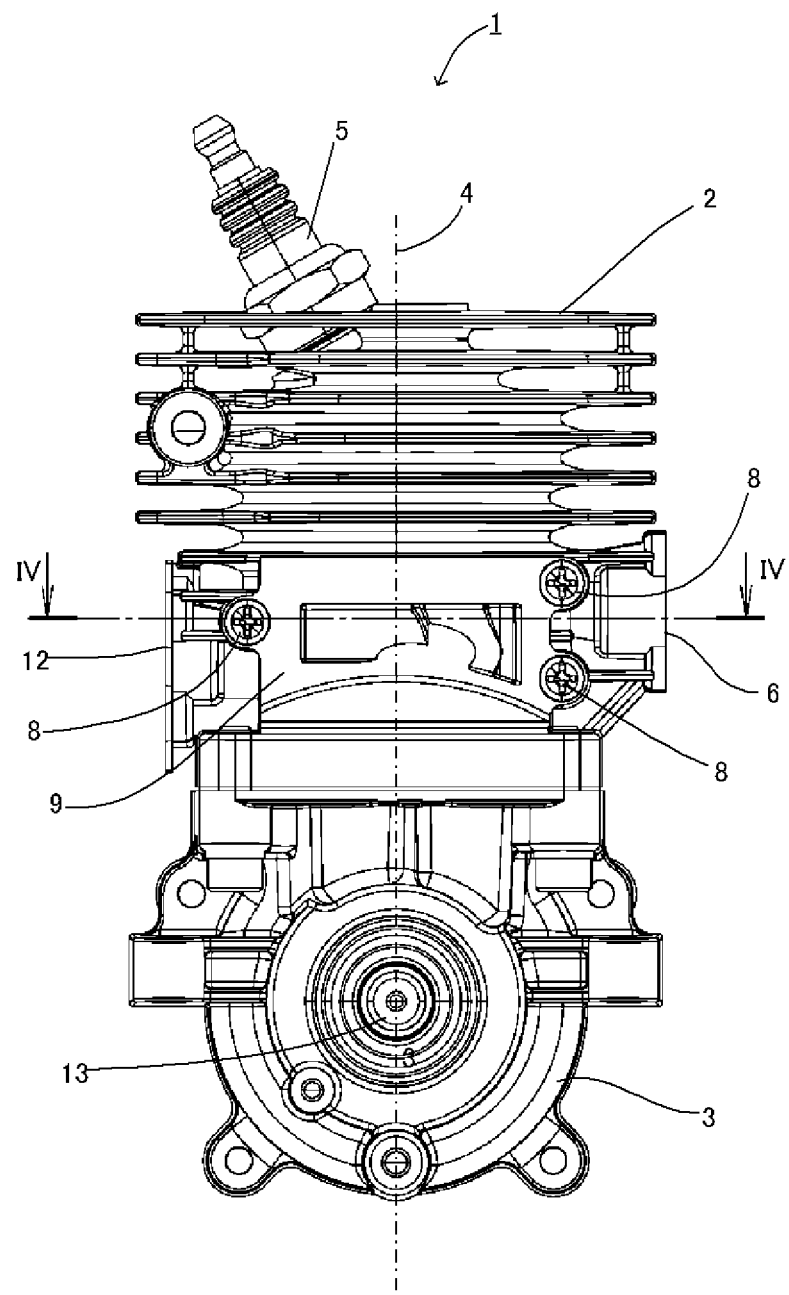
FIG. 3 is a side view of the engine in FIG. 1.

As shown in FIGS. 2 and 3, a crankcase 3 is attached to a cylinder block 2 of the engine 1. A piston (not shown) moves up and down (the vertical direction in FIGS. 2 and 3) in a cylinder bore 14 (see FIG. 4) of the cylinder block 2 in the direction of an axis line 4 (see FIG. 3) of the cylinder bore 14. A spark plug 5 is attached to the upper part of the cylinder block 2. An exhaust port 6 is provided on a side of the cylinder block 2. Furthermore, a first scavenging passage 10 and a second scavenging passage 11, which are partly formed by scavenging passage covers 9 fastened by mounting screws 8 via gaskets 7, and an intake port 12 (see FIG. 3) are formed on sides of the cylinder block 2. A pair of (two) scavenging passage covers 9 is provided on opposite sides of the cylinder block 2 with the cylinder bore 14 in-between. Then, a pair of (two) first scavenging passages 10 and a pair of (two) second scavenging passages 11 are also provided with the cylinder bore 14 in-between. A crankshaft 13 is rotatably supported by the crankcase 3. The crankshaft 13 is connected to the piston via a connecting rod (not shown) and a piston pin (not shown).

Figure 4:
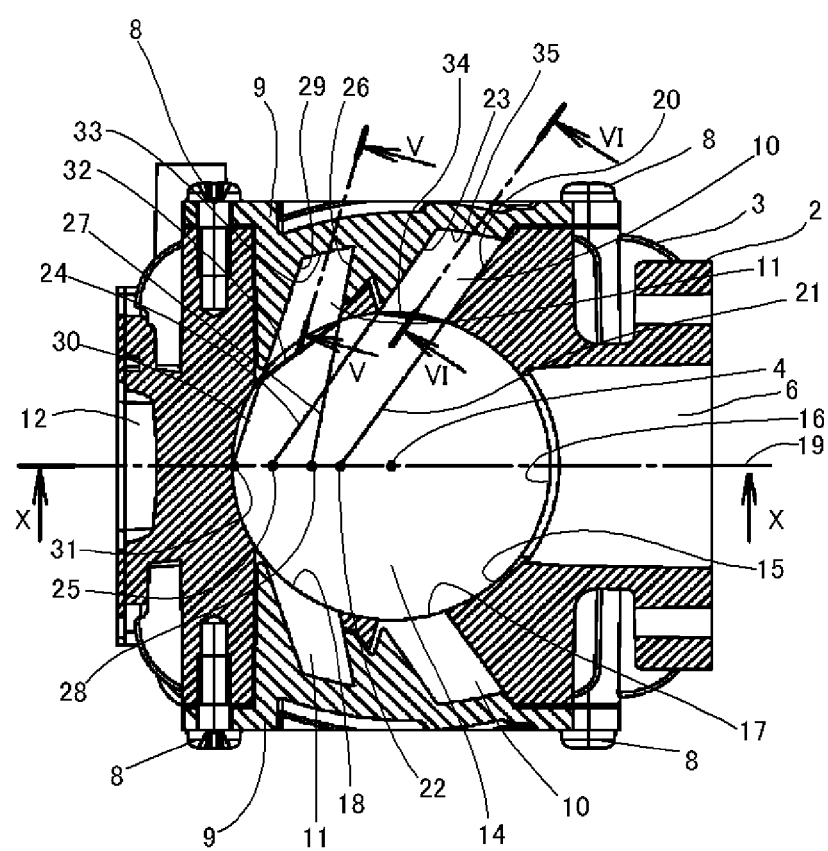
FIG. 4 is a cross-sectional view at the line IV-IV in FIG. 3.

As shown in FIG. 4, an exhaust opening 16 connected to the exhaust port 6, first scavenging openings 17 connected to the first scavenging passages 10, and second scavenging openings 18 connected to the second scavenging passages 11 are formed on the inner peripheral wall 15 of the cylinder bore 14 when seen in the direction of the axis line 4 of the cylinder bore 14. The first and second scavenging passages 10 and 11 extend within the cylinder block 2 downward (toward the bottom dead center) in the direction of the axis line 4 of the cylinder bore 14 and communicate with a crank chamber (not shown) formed in the crankcase 3. The first scavenging passages 10 and first scavenging openings 17 are provided nearly symmetrically about a line 19 passing through a point bisecting the exhaust opening 16 in the circumferential direction and the axial line 4 of the cylinder bore 14. On the other hand, the second scavenging passages 11 and second scavenging openings 18 are also provided nearly symmetrically about the line 19 passing through a point bisecting the exhaust opening 16 in the circumferential direction and the axial line 4 of the cylinder bore 14. In regard to the first scavenging passage 10 in the vicinity of the first scavenging opening 17, the intersection 22 between the extended line 21 of the wall surface 20 closer to the exhaust opening 16 into the cylinder bore 14 and the line 19 is situated inside the cylinder bore 14, and the intersection 25 between the extended line 24 of the wall surface 23 away from the exhaust opening 16 into the cylinder bore 14 and the line 19 is situated inside the cylinder bore 14. On the other hand, in regard to the second scavenging passage 11 in the vicinity of the second scavenging opening 18, the intersection 28 between the extended line 27 of the wall surface 26 closer to the exhaust opening 16 into the cylinder bore 14 and the line 19 is situated inside the cylinder bore 14, and the intersection 31 between the extended line 30 of the wall surface 29 away from the exhaust opening 16 into the cylinder bore 14 and the line 19 is situated inside the cylinder bore 14. The wall surfaces 23 and 26 are inclined so that the intersection 28 is closer to the exhaust opening 16 than the intersection 25. Here, the line V-V is a line passing through the midpoint of a chord 32 connecting the respective intersections between the extended lines 27 and 30 of the second scavenging passage 11 and the inner peripheral wall 15 of the cylinder bore 14 and the midpoint of the outer wall 33 of the second scavenging passage 11 farthermost from the cylinder bore 14 in the radial direction of the cylinder bore 14. On the other hand, the line VI-VI is a line passing through the midpoint of a chord 34 connecting the respective intersections between the extended lines 21 and 24 of the first scavenging passage 10 and the inner peripheral wall 15 of the cylinder bore 14 and the midpoint of the outer wall 35 of the first scavenging passage 10 farthermost from the cylinder bore 14 in the radial direction of the cylinder bore 14.

Figure 5:
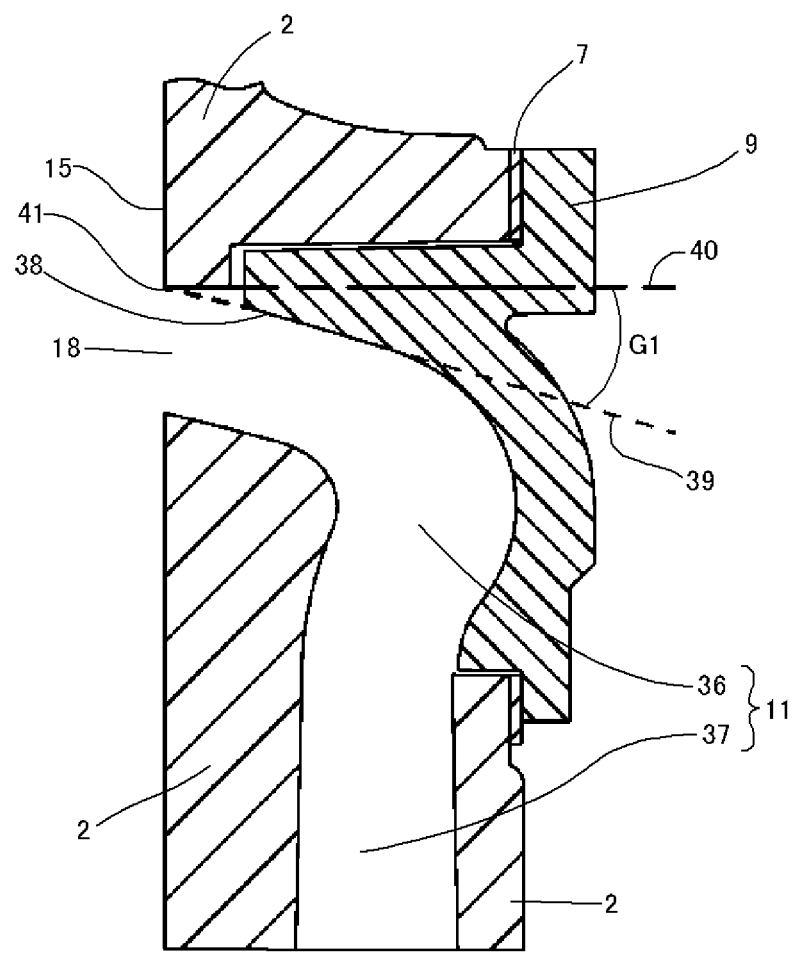
FIG. 5 is a cross-sectional view at the line V-V in FIG. 4.

As shown in FIG. 5, the second scavenging passage 11 consists of a second upper scavenging passage part (upper scavenging passage) 36 and a second lower scavenging passage part (lower scavenging passage) 37. The second upper scavenging passage part 36 is formed by the cylinder block 2 and scavenging passage cover 9, connected to the second scavenging opening 18, and extends in a curve in the direction from the top dead center to the bottom dead center (downward in the figure). The second lower scavenging passage part 37 is formed by the cylinder block 2, connected to the lower end of the second upper scavenging passage part 36, and extends toward the crank chamber (not shown) below. The wall surface 38 of the second scavenging passage 11 (the second upper scavenging passage part 36) near the top dead center (the top in the figure) in the vicinity of the second scavenging opening 18 is inclined in the direction to the top dead center as it becomes closer to the cylinder bore. The extended line 39 of the wall surface 38 makes a blow-up angle G1 with respect to a plane 40 perpendicular to the axial line of the cylinder bore. The second upper scavenging passage part 36 is formed so that the extended line 39 of the wall surface 39 makes contact with the upper end 41 of the second scavenging opening 18 formed by the cylinder block 2.

Figure 6:
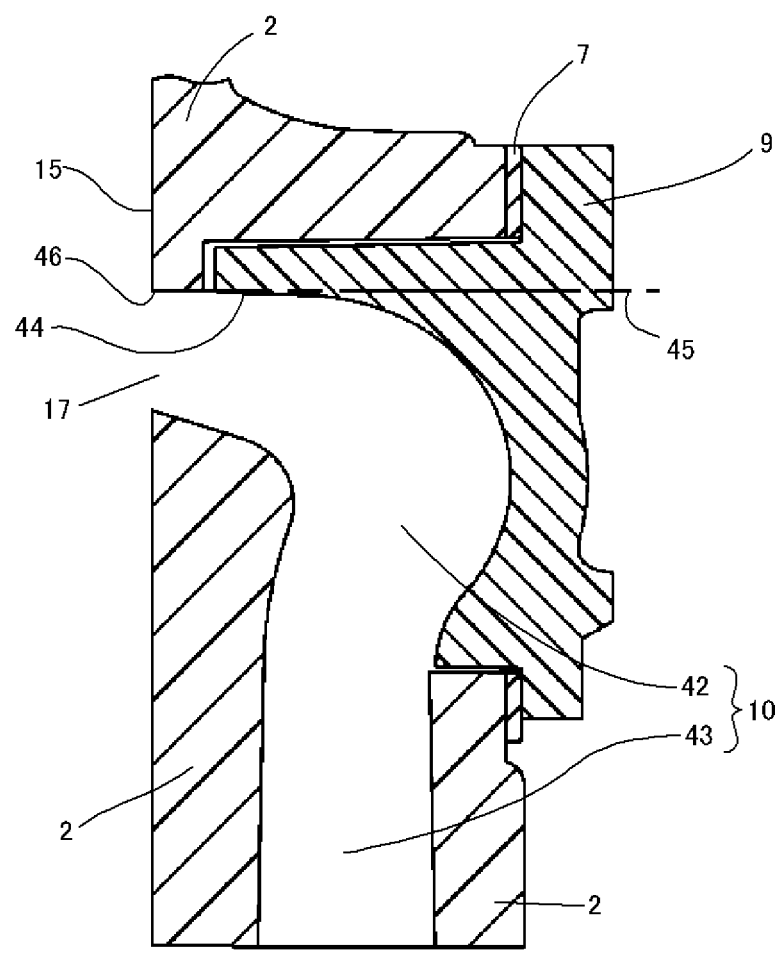
FIG. 6 is a cross-sectional view at the line VI-VI in FIG. 4.

As shown in FIG. 6, the first scavenging passage 10 consists of, like the second scavenging passage 11, a first upper scavenging passage part (upper scavenging passage) 42 and a first lower scavenging passage part (lower scavenging passage) 43. The first upper scavenging passage part 42 is formed by the cylinder block 2 and scavenging passage cover 9, connected to the first scavenging opening 17, and extends in a curve in the direction from the top dead center to the bottom dead center (downward in the figure). The first lower scavenging passage part 43 is formed by the cylinder block 2, connected to the lower end of the first upper scavenging passage part 42, and extends toward the crank chamber (not shown) below. The wall surface 44 of the first scavenging passage 10 (the first upper scavenging passage part 42) near the top dead center (the top in the figure) in the vicinity of the first scavenging opening 17 is formed nearly in parallel to or nearly coinciding with a plane 45 perpendicular to the axial line of the cylinder bore, in other words in the manner that the blow-up angle is nearly zero, which is smaller than the blow-up angle G1 of the second scavenging opening 18. The first upper scavenging passage part 42 is formed so that the extension of the wall surface 44 coincides with the upper end 46 of the first scavenging opening 17 that is formed by the cylinder block 2 nearly in parallel to the plane 45.

Figure 7:
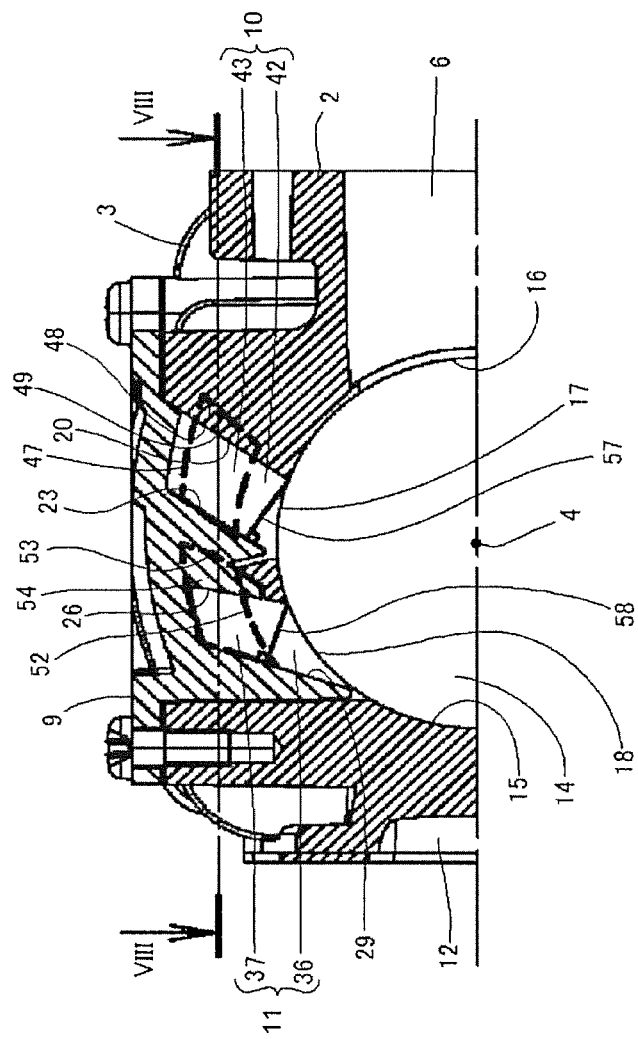
FIG. 7 is an enlarged, cross-sectional view of the upper part of FIG. 4.
Figure 8:
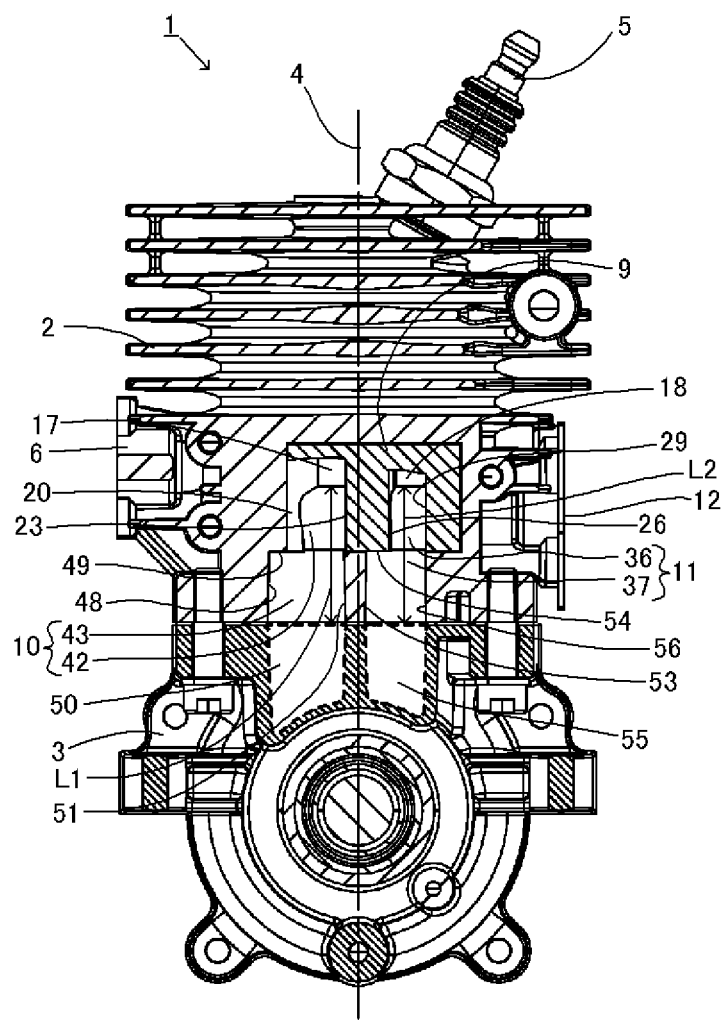
FIG. 8 is a cross-sectional view at the line VIII-VIII in FIG. 7.

As shown in FIG. 7, when seen in the direction of the axial line 4 of the cylinder bore 14, the width in the circumferential direction of the cylinder bore 14 of the first lower scavenging passage part 43 (the cross-section of which is shown by the dotted line 47) constituting the first scavenging passage 10 is larger than the width in the circumferential direction of the cylinder bore 14 of the first upper scavenging passage part 42. Furthermore, as shown in FIGS. 7 and 8, the wall surface 48 of the first lower scavenging passage part 43 on the side closer to the exhaust opening 16 is closer to the exhaust opening 16 in the circumferential direction of the cylinder bore 14 than the wall surface 20 of the first upper scavenging passage part 42 on the side closer to the exhaust opening 16. Therefore, a first step (step) 49 is formed at the connection part between the first upper and lower scavenging passage parts 42 and 43, where a part of the wall surface of the cylinder block 2 serves to reduce the width in the circumferential direction of the cylinder bore 14 stepwise in the direction from the first lower scavenging passage part 43 to the first upper scavenging passage part 42. In other words, the first upper and lower scavenging passage parts 42 and 43 are provided in the manner that the first upper scavenging passage part 42 is offset in the direction to the inside of the first lower scavenging passage part 43 and away from the exhaust opening 16 in the circumferential direction of the cylinder bore 14, or the first upper scavenging passage part 42 is connected to the first lower scavenging passage part 43 in the manner that the former is shifted with respect to the latter in the direction to the inside of the first lower scavenging passage 43 and away from the exhaust opening 16 in the circumferential direction of the cylinder bore 14. The first step 49 or the offset geometry or shifted connection between the first upper and lower scavenging passage parts 42 and 43 constitutes an outflow direction change device. Here, as shown in FIG. 8, the first step 49 forms a step extending in the direction nearly perpendicular to the axial line 4 of the cylinder bore 14 and partly closing the first scavenging passage 10. The first step 49 is provided nearly at the midpoint of the first scavenging passage length L1 corresponding to the distance between a first communication part 50 communicating the crank chamber of the crankcase 3 with the first scavenging passage 10 and the first scavenging opening 17 in the direction of the axial line 4 of the cylinder bore 14. In other words, the first upper and lower scavenging passage parts 42 and 43 are connected to each other neatly at the midpoint of the first scavenging passage length L1. Furthermore, as shown in FIG. 7, the wall surface 23 of the first scavenging passage 10 on the side away from the exhaust opening 16 is flat. In other words, as shown in FIG. 8, the wall surface 51 of the first lower scavenging passage part 43 on the side away from the exhaust opening 16 is nearly flush with the wall surface 23 of the first upper scavenging passage part 42 on the side away from the exhaust opening 16.

As shown in FIG. 7, like the first scavenging passage 10, the width in the circumferential direction of the cylinder bore 14 of the second lower scavenging passage part 37 (the cross-section of which is shown by the dotted line 52) constituting the second scavenging passage 11 is larger than the width in the circumferential direction of the cylinder bore 14 of the second upper scavenging passage part 36. Furthermore, the wall surface 53 of the second lower scavenging passage part 37 on the side closer to the exhaust opening 16 is closer to the exhaust opening 16 in the circumferential direction of the cylinder bore 14 than the wall surface 26 of the second upper scavenging passage part 36 on the side closer to the exhaust opening 16. Therefore, a second step (step) 54 is formed at the connection part between the second upper and lower scavenging passage parts 36 and 37, where the scavenging passage cover 9 serves to reduce the width in the circumferential direction of the cylinder bore 14 stepwise in the direction from the second lower scavenging passage part 37 to the second upper scavenging passage part 36. In other words, the second upper and lower scavenging passage parts 36 and 37 are connected in the manner that the second upper scavenging passage part 36 is offset in the direction to the inside of the second lower scavenging passage part 37 and away from the exhaust opening 16 in the circumferential direction of the cylinder bore 14. The second step 54 or the offset connection between the second upper and lower scavenging passage parts 36 and 37 constitutes an outflow direction change device. Here, as shown in FIG. 8, the second step 54 forms a step extending in the direction nearly perpendicular to the axial line 4 of the cylinder bore 14 and partly closing the second scavenging passage 11. The second step 54 is provided nearly at the midpoint of the second scavenging passage length L2 corresponding to the distance between a second communication part 55 communicating the crank chamber of the crankcase 3 with the second scavenging passage 11 and the second scavenging opening 18 in the direction of the axial line 4 of the cylinder bore 14. In other words, the second upper and lower scavenging passage parts 36 and 37 are connected to each other neatly at the midpoint of the second scavenging passage length L2. Furthermore, as shown in FIG. 7, the wall surface 26 of the second scavenging passage 11 on the side away from the exhaust opening 16 is flat. In other words, as shown in FIG. 8, the wall surface 56 of the second lower scavenging passage part 37 on the side away from the exhaust opening 16 is nearly flush with the wall surface 26 of the second upper scavenging passage part 36 on the side away from the exhaust opening 16.

Figure 9:
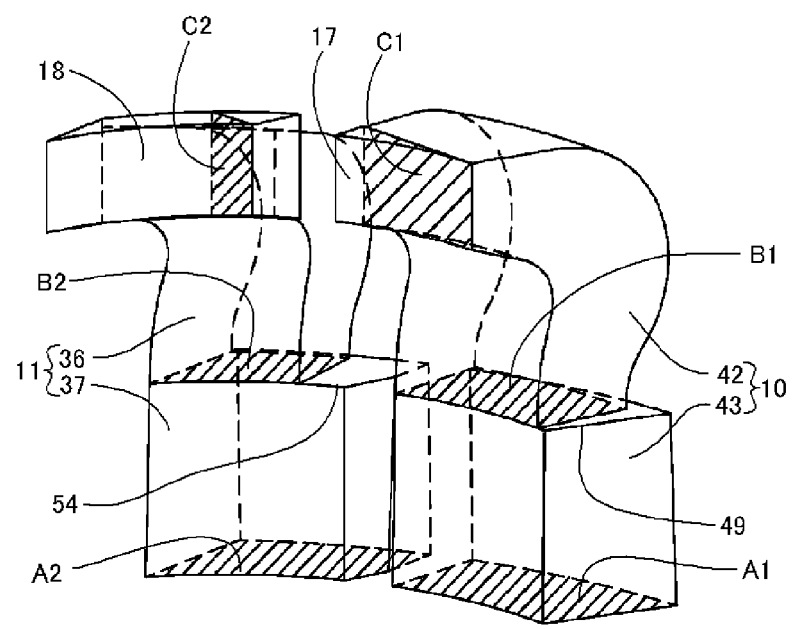
FIG. 9 is a perspective view showing the first and second scavenging passages of the engine in FIG. 1.

As shown in FIG. 9, the channel cross-sectional area A1 of the first lower scavenging passage part 43 of the first scavenging passage 10 on the crankcase side (the lower side in the figure) of the first step 49 is larger than the channel cross-sectional area B1 at the first step 49 where the upper and lower scavenging passage parts 42 and 43 are connected to each other. Furthermore, the channel cross-sectional area B1 at the first step 49 is larger than the channel cross-sectional area C1 of the first upper scavenging passage part 42 near the first scavenging opening 17. In other words, the channel cross-sectional areas A1, B1, and C1 of the first scavenging passage 10 are decreased from the crankcase side to the first scavenging opening 17, satisfying A1>B1>C1. Here, as shown in FIG. 7, the channel cross-sectional area C1 near the first scavenging opening 17 is a cross-sectional area at the position where the first scavenging passage 10 has a substantial passage width indicated by the line segment 57 extending from the intersection between the wall surface 20 of the first scavenging passage 10 on the side closer to the exhaust opening 16 and the cylinder bore 14 in the direction perpendicular to the wall surface 23 of the first scavenging passage 10 on the side away from the exhaust opening 16. Similarly, the channel cross-sectional area A2 of the second lower scavenging passage part 37 of the second scavenging passage 11 on the crankcase side (the lower side in the figure) of the second step 54 is larger than the channel cross-sectional area B2 at the second step 54 where the second upper and lower scavenging passage parts 36 and 37 are connected to each other. Furthermore, the channel cross-sectional area B2 at the second step 54 is larger than the channel cross-sectional area C2 of the second upper scavenging passage part 36 near the second scavenging opening 18. In other words, the channel cross-sectional areas A2, B2, and C2 of the second scavenging passage 11 are decreased from the crankcase side to the second scavenging opening 18, satisfying A2>B2>C2. Here, as shown in FIG. 7, the channel cross-sectional area C2 near the second scavenging opening 18 is a cross-sectional area at the position where the second scavenging passage 11 has a substantial passage width indicated by the line segment 58 extending from the intersection between the wall surface 26 of the second scavenging passage 11 on the side closer to the exhaust opening 16 and the cylinder bore 14 in the direction perpendicular to the wall surface 29 of the second scavenging passage 11 on the side away from the exhaust opening 16.

Figure 10:
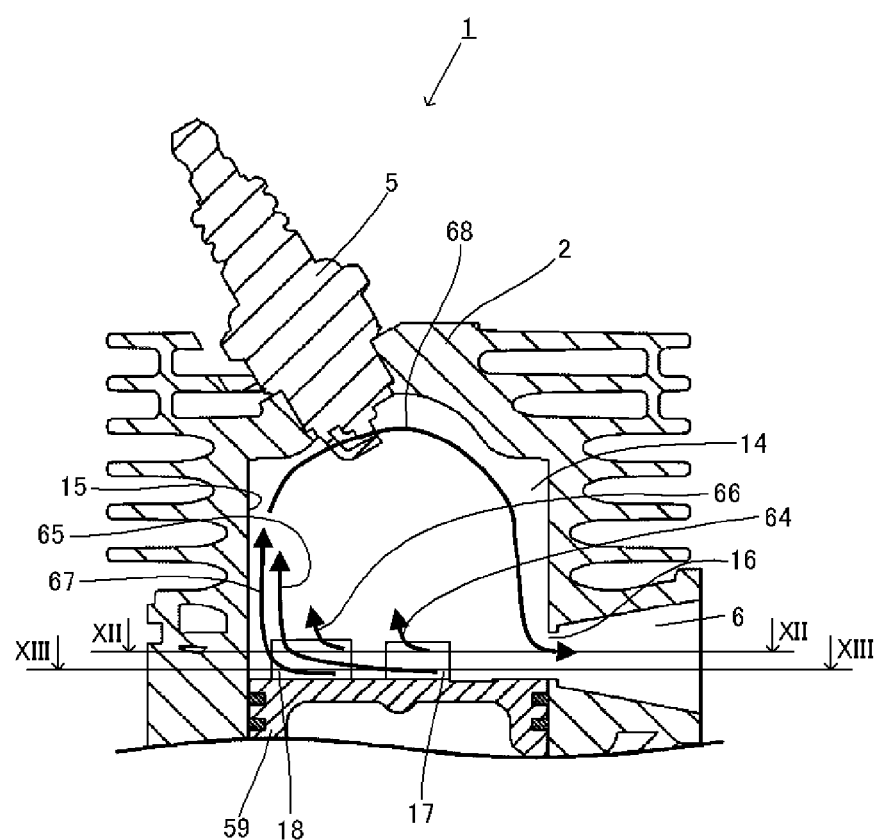
FIG. 10 is a cross-sectional view at the line X-X in FIG. 4.

In the engine 1 having the above structure, as the piston 59 is lowered as shown in FIG. 10, the air-fuel mixture flows out from the first and second scavenging openings 17 and 18 into the cylinder bore 14 and the combustion gas in the cylinder bore 14 is discharged through the exhaust port 6 via the exhaust opening 16.

Figure 11:
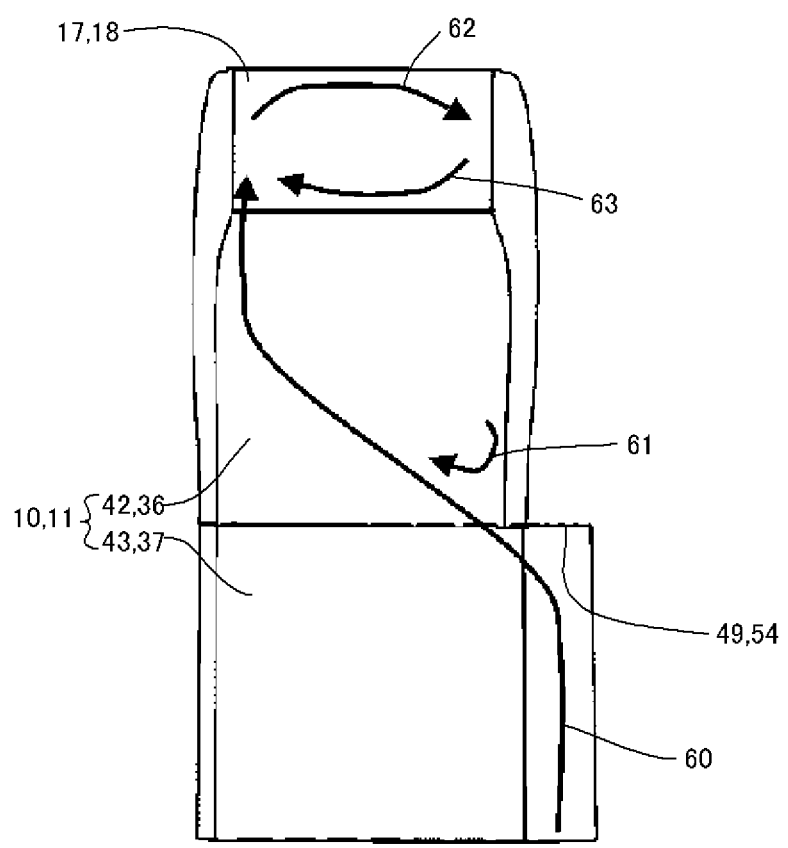
FIG. 11 is a schematic cross-sectional view of the scavenging passage for showing how the air-fuel mixture flows in the scavenging passage.
Figure 12:
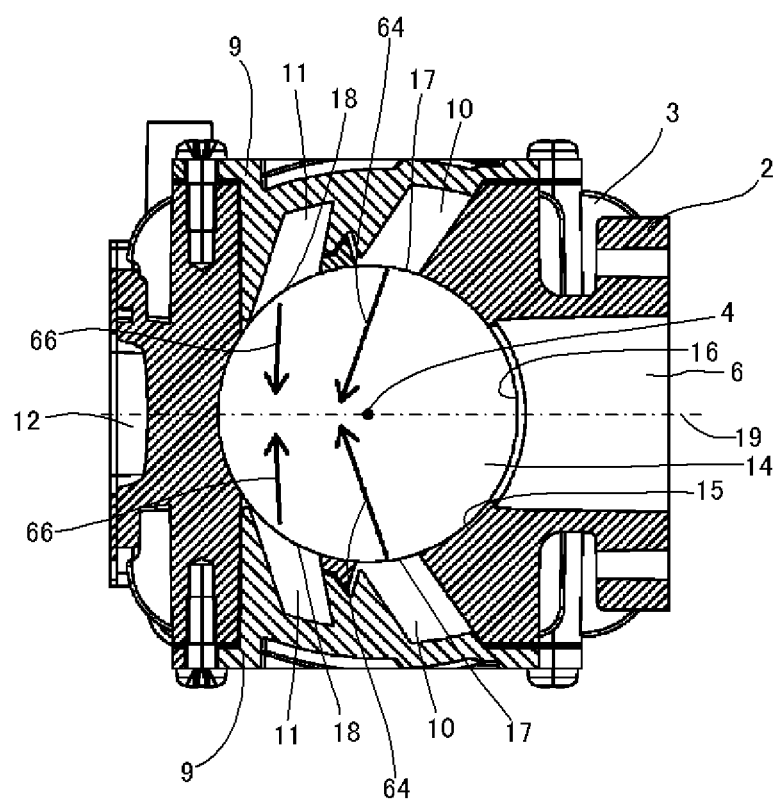
FIG. 12 is a cross-sectional view at the line XII-XII in FIG. 10.
Figure 13:
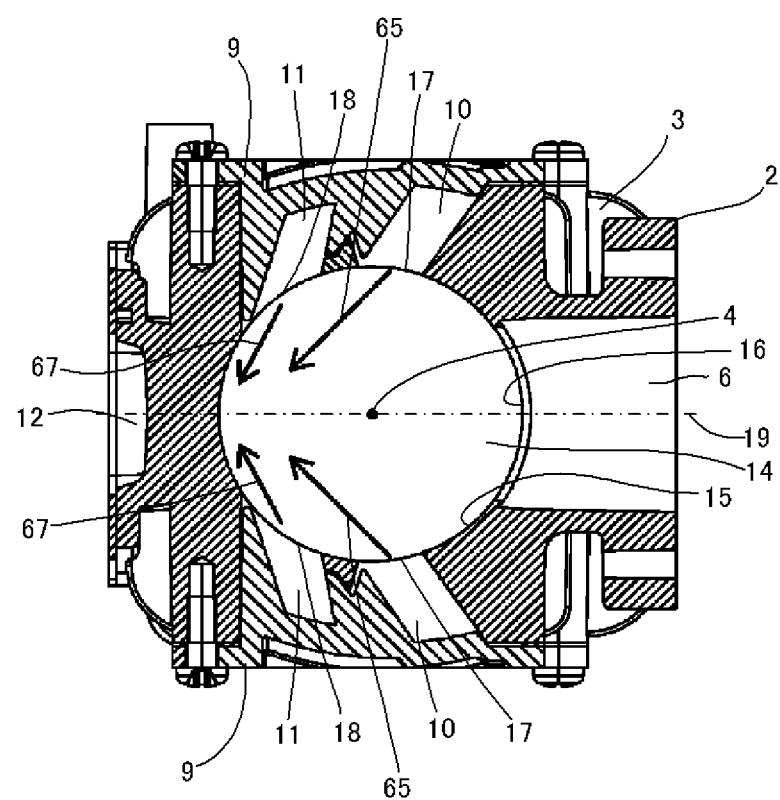
FIG. 13 is a cross-sectional view at the line XIII-XIII in FIG. 10.

Here, as shown in FIG. 11, in the first scavenging passage 10, the air-fuel mixture having flown into the first scavenging passage 10 from the crank chamber moves in the first lower scavenging passage part 43 in the direction to the top dead center (upward in the figure). Then, colliding with the first step 49, the air-fuel mixture flowing on the side closer to the exhaust opening (on the right in the figure) is abruptly turned as shown by an arrow 60. Therefore, a vortex flow of air-fuel mixture rotating clockwise in FIG. 11 occurs in the first upper scavenging passage part 42 near the first step 49 as shown by an arrow 61. The vortex flow moves up in the first upper scavenging passage part 42 toward the first scavenging opening 17 while rotating. Then, the vortex flow causes a flow flowing in the direction to the exhaust opening as shown by an arrow 62 near the top dead center of the first scavenging opening 17 and a flow flowing in the direction away from the exhaust opening as shown by an arrow 63 near the bottom dead center of the first scavenging opening 17. Then, as shown in FIG. 12, a flow of air-fuel mixture flowing into the cylinder bore 14 from near the top dead center of the first scavenging opening 17 heads for the center (axial line 4) of the cylinder bore 14 as shown by an arrow 64. On the other hand, unlike the flow of air-fuel mixture flowing into the cylinder bore 14 from near the top dead center of the first scavenging opening 17 as shown in FIG. 12, a flow of air-fuel mixture flowing into the cylinder bore 14 from near the bottom dead center of the first scavenging opening 17 heads for the inner peripheral wall 15 of the cylinder bore 14 opposite to the exhaust opening 16 (the inner peripheral wall 15 of the cylinder bore 14 near the intake port 12) as shown by an arrow 65 in FIG. 13. Therefore, the flow of air-fuel mixture flowing into the cylinder bore 14 from the first scavenging opening 17 can be controlled to flow in different directions between those from near the top dead center and from near the bottom dead center of the first scavenging opening 17. In other words, with the use of the outflow direction change device constituted by the shifted positions of the first lower and upper scavenging passage parts 43 and 42 and the first step 49, the flow of air-fuel mixture flowing into the cylinder bore 14 can be controlled to flow in different directions between those from near the top dead center and from near the bottom dead center of the first scavenging opening 17 by a simple and inexpensive structure.

Furthermore, as shown in FIG. 11, in the second scavenging passage 11, the air-fuel mixture having flown into the second scavenging passage 11 from the crank chamber moves in the second lower scavenging passage part 37 in the direction to the top dead center (upward in the figure) as in the first scavenging passage 11. Then, colliding with the second step 54, the air-fuel mixture flowing on the side closer to the exhaust opening (on the right) is abruptly turned as shown by an arrow 60. Therefore, a vortex flow of air-fuel mixture rotating clockwise in FIG. 11 occurs in the second upper scavenging passage part 36 near the second step 54 as shown by an arrow 61. The vortex flow moves up in the second upper scavenging passage part 36 toward the second scavenging opening 18 while rotating. Then, the vortex flow causes a flow flowing in the direction to the exhaust opening as shown by an arrow 62 near the top dead center of the second scavenging opening 18 and a flow flowing in the direction away from the exhaust opening as shown by an arrow 63 near the bottom dead center of the second scavenging opening 18. Then, as shown in FIG. 12, a flow of air-fuel mixture flowing into the cylinder bore 14 from near the top dead center of the second scavenging opening 18 makes nearly a right angle with respect to the line 19 connecting a point bisecting the exhaust opening 16 in the circumferential direction and the axial line 4 of the cylinder bore 14 as shown by an arrow 66, heading for the opposite second scavenging opening 18. On the other hand, unlike the flow of air-fuel mixture flowing into the cylinder bore 14 from near the top dead center of the second scavenging opening 18 as shown in FIG. 12, a flow of air-fuel mixture flowing into the cylinder bore 14 from near the bottom dead center of the second scavenging opening 18 heads for the inner peripheral wall 15 of the cylinder bore 14 opposite to the exhaust opening 16 (the inner peripheral wall 15 of the cylinder bore 14 near the intake port 12) as shown by an arrow 67 in FIG. 13. Therefore, the flow of air-fuel mixture flowing into the cylinder bore 14 from the second scavenging opening 18 can be controlled to flow in different directions between those from near the top dead center and from near the bottom dead center of the second scavenging opening 18. In other words, with the use of the outflow direction change device constituted by the shifted positions of the second lower and upper scavenging passage parts 37 and 36 and the second step 54, the flow of air-fuel mixture flowing into the cylinder bore 14 can be controlled to flow in different directions between from near the top dead centers and from near the bottom dead center of the second scavenging opening 18 by a simple and inexpensive structure.

Form the above, as shown in FIG. 10, the flow of air-fuel mixture 65 flowing into the cylinder bore 14 from near the bottom dead center of the first scavenging opening 17 and the flow of air-fuel mixture 67 flowing into the cylinder bore 14 from near the bottom dead center of the second scavenging opening 18 flow away from the exhaust opening 16. Then, the flows of air-fuel mixture 65 and 67 move up along the inner peripheral wall 15 of the cylinder bore 14. They flow in the upper part of the cylinder bore 14 where the spark plug 5 is provided and form a reverse flow 68 that drives the combustion gas in the cylinder bore 14 out from the exhaust opening 16. On the other hand, the flow of air-fuel mixture 64 flowing into the cylinder bore 14 from near the top dead center of the first scavenging opening 17 and the flow of air-fuel mixture 66 flowing into the cylinder bore 14 from near the top dead center of the second scavenging opening 18 convect in the cylinder bore 14 remotely from the reverse flow 68 without being taken into the reverse flow 68. Therefore, the outflow of the air-fuel mixture flowing out from the first and second scavenging openings 17 and 18 into the cylinder bore 14, or the short circuiting can be controlled, whereby the characteristic values of the exhaust gas can be lowered. Consequently, the amount of catalyst for lowering the characteristic values of the exhaust gas can be reduced and the engine cost can significantly be reduced. Furthermore, the increased volume of air-fuel mixture staying in the cylinder bore 14 improves the output. Furthermore, the air-fuel mixture flowing out from one scavenging opening can be controlled to flow in different directions between those from near the top dead center and from near the bottom dead center. There is no need of increasing the number of scavenging openings for the purpose of controlling the outflow direction. The present invention can easily be applied to a two-cycle engine of low engine displacement of which the cylinder bore 14 has a relatively small diameter. Consequently, a small two-cycle engine having excellent exhaust gas characteristics and an engine tool comprising it can be provided.

Furthermore, as shown in FIG. 4, the intersection 22 between the extended line 21 of the wall surface 20 of the first scavenging passage 10 on the side closer to the exhaust opening 16 in the vicinity of the first scavenging opening 17 and the line 19, the intersection 25 between the extended line 24 of the wall surface 23 on the side away from the exhaust opening 16 and the line 19, the intersection 28 between the extended line 27 of the wall surface 26 of the second scavenging passage 11 on the side closer to the exhaust opening 16 in the vicinity of the second scavenging opening 18 and the line 19, and the intersection 31 between the extended line 30 of the wall surface 29 on the side away from the exhaust opening 16 and the line 19 are each situated inside the cylinder bore 14. Additionally, the wall surfaces 23 and 26 are inclined so that the intersection 28 is closer to the exhaust opening 16 than the intersection 25. Therefore, the flow of air-fuel mixture flowing into the cylinder bore 14 from near the bottom dead center of the first scavenging opening 17 heads for the inner peripheral wall 15 of the cylinder bore 14 opposite to the exhaust opening 16 (a position away from the exhaust opening 16). On the other hand, the flow of air-fuel mixture flowing into the cylinder bore 14 from near the bottom dead center of the second scavenging opening 18 heads for a point closer to the exhaust opening 16 compared with the flow from near the bottom dead center of the first scavenging opening 17. In this way, the air-fuel mixture flowing in from near the bottom dead center of the first scavenging opening 17 and from near the bottom dead center of the second scavenging opening 18 easily form a reverse flow while the air-fuel mixture flowing in from near the bottom dead center of the second scavenging opening 18, which is close to the inner peripheral wall 15 of the cylinder bore 14, and heading for the inner peripheral wall 15 is suppressed in strength so as to reduce the short circuiting of the air-fuel mixture.

Furthermore, as shown in FIGS. 5 and 6, the blow-up angle G1 of the second scavenging opening 18 has a larger inclination toward the top dead center compared with the blow-up angle of the first scavenging opening 17. Therefore, the air-fuel mixture flowing into the cylinder bore 14 from the first and second scavenging openings 17 and 18 moves up along the inner peripheral wall 15 of the cylinder bore 14, flows in the upper part of the cylinder bore 14 where the spark plug is provided, and easily forms a reverse flow that drives the combustion gas in the cylinder bore 14 out from the exhaust opening 16.

Furthermore, as shown in FIG. 9, the channel cross-sectional area of the first scavenging passage 10 is designed in the manner that the channel cross-sectional area A1 below the first step 49 is larger than the channel cross-sectional area B1 at the first step 49 and the channel cross-sectional area B1 at the first step 49 is larger than the channel cross-sectional area C1 near the first scavenging opening 17. Furthermore, the channel cross-sectional area of the second scavenging passage 11 is designed in the manner that the channel cross-sectional area A2 below the second step 54 is larger than the channel cross-sectional area B2 at the second step 54 and the channel cross-sectional area B2 at the second step 54 is larger than the channel cross-sectional area C2 near the second scavenging opening 18. In other words, the channel cross-sectional area of each scavenging passage satisfies the relationship A1>B1>C1 or A2>B2>C2. Therefore, the first scavenging passage 10 has no reduction in the channel cross-sectional area downstream of the first scavenging opening 17 and the second scavenging passage 11 has no reduction in the channel cross-sectional area downstream of the second scavenging opening 17. Therefore, there is no chance of the first and second steps 49 and 54 serving as a restrictor and reducing the charging efficiency, whereby the filling efficiency of air-fuel mixture flowing into the cylinder can be improved to improve the engine output.

Furthermore, the first and second upper scavenging passage parts 42 and 36 are partly formed by the scavenging cover 9. Therefore, the passage shape of the first and second upper scavenging passage parts 42 and 36 can be changed simply by changing the shape of the scavenging cover 9. Then, tests and trial production for determining an optimum shape of the scavenging passage can easily be performed at low cost. Furthermore, primarily composed of the first step 49 or second step 54, the outflow direction change device can be realized by a simple structure at low cost.

Figure 14:
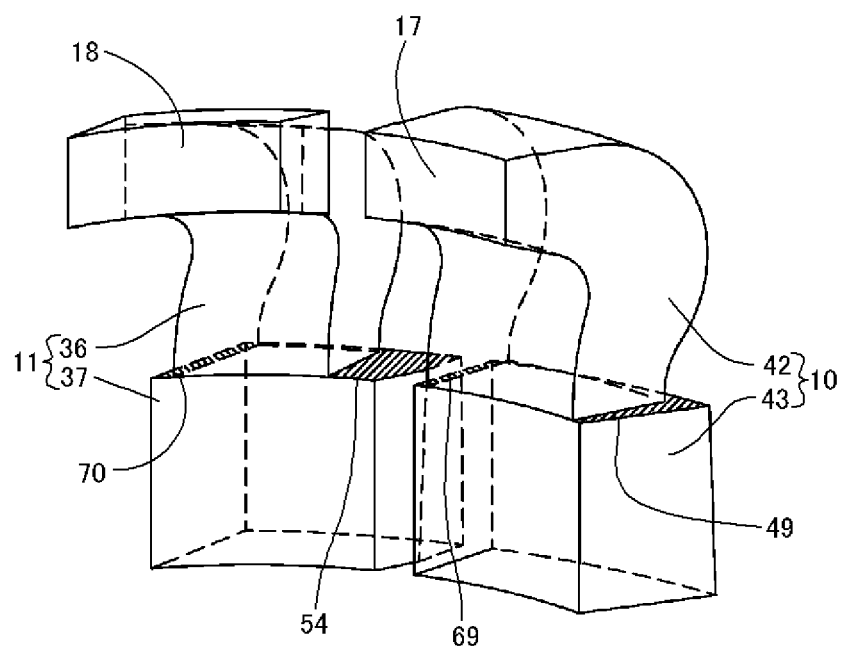
FIG. 14 is an illustration showing a modification in the first and second scavenging passages in accordance with FIG. 9.

In the above embodiment, the first upper scavenging passage part 42 is connected to the first lower scavenging passage part 43 in a shifted manner in the direction to the inside of the first lower scavenging passage part 43 and away from the exhaust opening 16 in the circumferential direction of the cylinder bore 14 and the second upper scavenging passage part 36 is connected to the second lower scavenging passage part 37 in a shifted manner in the direction to the inside of the second lower scavenging passage part 37 and away from the exhaust opening 16 in the circumferential direction of the cylinder bore 14. Therefore, the steps (the first and second steps 49 and 54) of the first and second scavenging passages 10 and 11 are formed on the side closer to the exhaust opening 16. However, as shown in FIG. 14, the first scavenging passage 10 can have a third step 69 that has a smaller width in the circumferential direction of the cylinder bore 14 than the first step 49 and less affects the flow of air-fuel mixture in the first scavenging passage 10 than the first step 49. Similarly, the second scavenging passage 11 can have on the side away from the exhaust opening 16 a fourth step 70 that has a smaller width in the circumferential direction of the cylinder bore 14 than the second step 54 and less affects the flow of air-fuel mixture in the second scavenging passage 11 than the second step 54.

Figure 15:
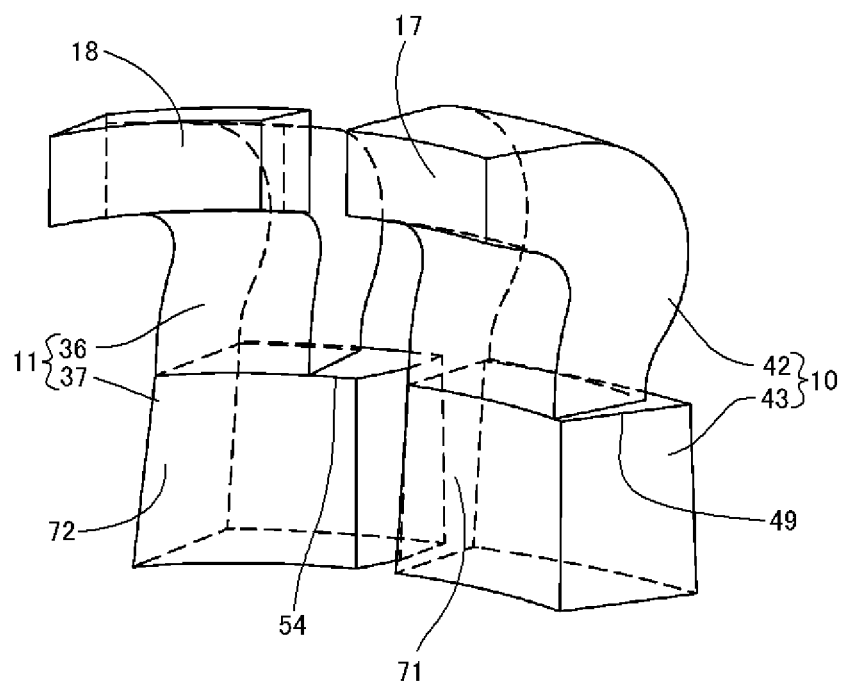
FIG. 15 is an illustration showing another modification in the first and second scavenging passages in accordance with FIG. 9.
Figure 16:
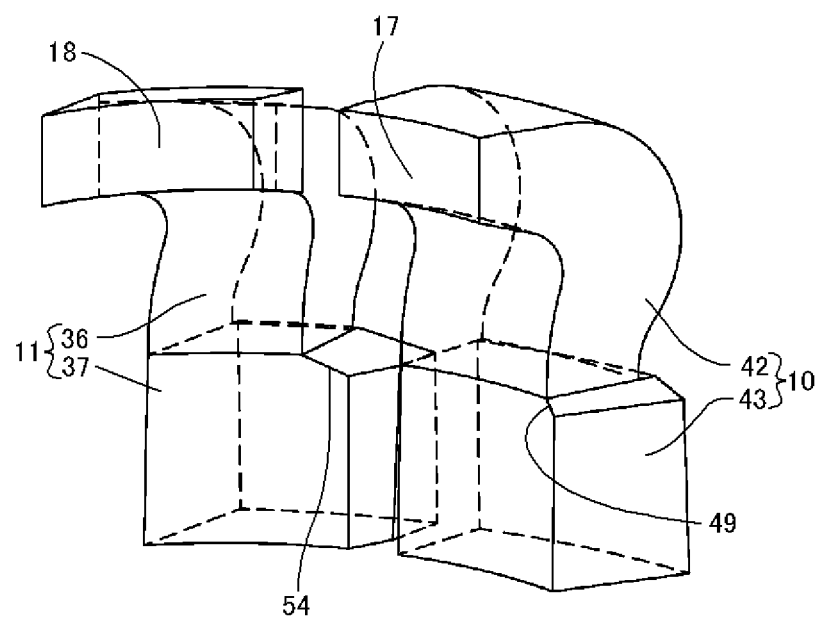
FIG. 16 is an illustration showing a further other modification in the first and second scavenging passages in accordance with FIG. 9.

Furthermore, as shown in FIG. 15, the inner wall 71 of the first lower scavenging passage part 43 on the side away from the exhaust opening 16 can be tapered away from the exhaust opening 16 as it goes down. Then, the inner wall 72 of the second lower scavenging passage part 37 on the side away from the exhaust opening 16 can be tapered away from the exhaust opening 16 as it goes down. Furthermore, as shown in FIG. 16, the first step 49 can be inclined with respect to a plane perpendicular to the axial line 4 of the cylinder bore 14. Furthermore, the second step 54 can be inclined with respect to a plane perpendicular to the axial line 4 of the cylinder bore 14. Here, in such a case, desirably, the first and second steps 49 and 54 are inclined with respect to a plane perpendicular to the axial line 4 of the cylinder bore 14 at an angle up to approximately 15 degrees in the direction to the top dead center and at an angle up to approximately 45 degrees in the direction to the bottom dead center.

Furthermore, the shifted connection between the first upper and lower scavenging passage parts 42 and 43 and the shifted connection between the second upper and lower scavenging passage parts 36 and 37 can be constituted only by the scavenging cover 9 or only by the cylinder block 2, instead of the scavenging cover 9 and cylinder block 2. Furthermore, the first and second scavenging passages 10 and 11 do not necessarily have a nearly rectangular cross-section and can have a triangular or circular cross-section having the steps and satisfying the above-described relationship of channel cross-sectional areas. Furthermore, the above-described first and second steps 49 and 54 are formed nearly at the midpoint of each scavenging passage length. They do not need to be precisely at the midpoint. They can be provided at an upper position closer to the first scavenging opening 17 or second scavenging opening or at a lower position closer to the crankcase 3.

Embodiment 2 of the present invention will be described hereafter with reference to FIGS. 17 to 19. In the engine of this embodiment, conversely to the engine 1 of Embodiment 1, the first upper scavenging passage part 142 and first lower scavenging passage part 143 of a first scavenging passage 110 are connected without shifting in the circumferential direction of the cylinder bore 14 and the second upper scavenging passage part 136 and second lower scavenging passage part 137 of a second scavenging passage 111 are connected without shifting in the circumferential direction of the cylinder bore 14. On the other hand, as described later, the inner wall of the first scavenging passage 110 extending in the direction of the axial line 4 of the cylinder bore 14 near the first scavenging opening 17 and the inner wall of the second scavenging passage 111 extending in the direction of the axial line 4 of the cylinder bore 14 near the second scavenging opening 18 are partly inclined at different angles to constitute an outflow direction change device. Here, the same components as in Embodiment 1 are referred to by the same reference numbers and their detailed explanation is omitted.

Figure 17:
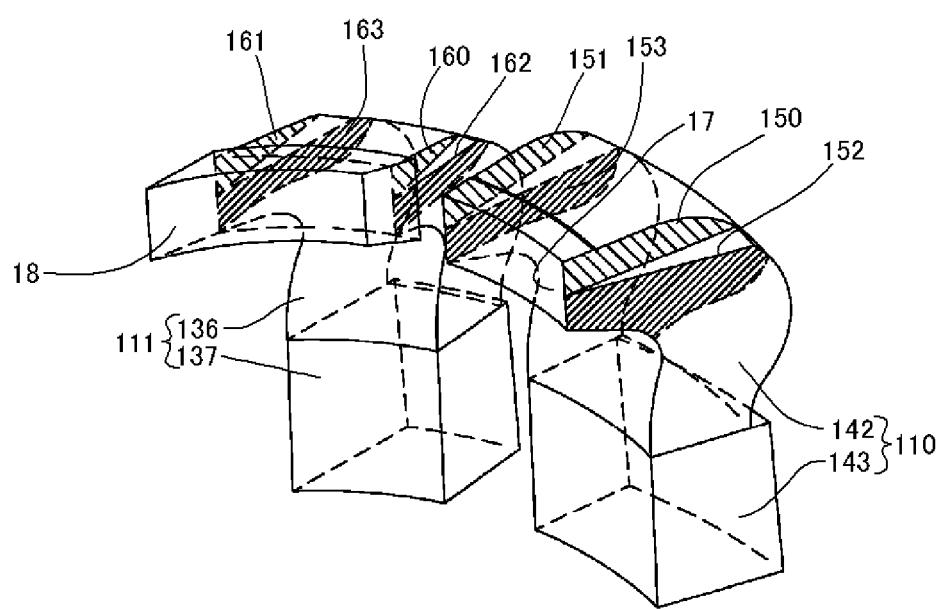
FIG. 17 is a perspective view of the first and second scavenging passages according to Embodiment 2 of the present Invention.
Figure 18:
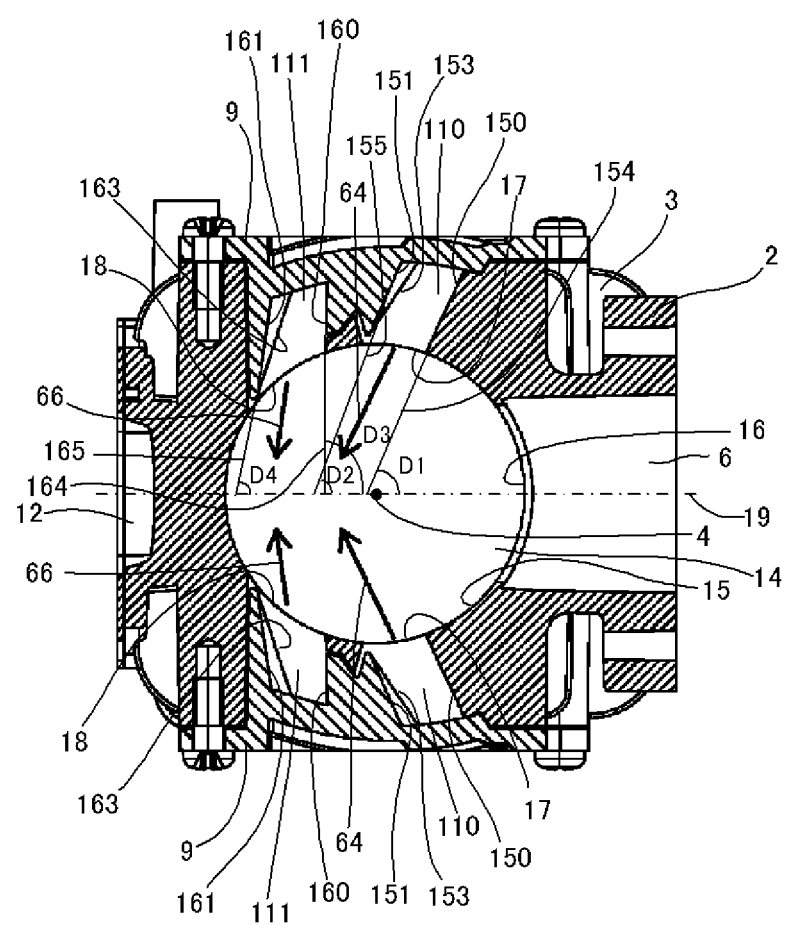
FIG. 18 is a cross-sectional view showing Embodiment 2 of the present invention in accordance with FIG. 12.

As shown in FIGS. 17 and 18, a first upper sidewall (first sidewall) 150 extending in parallel to the axial line 4 of the cylinder bore 14 on the side closer to the exhaust opening 16 and a second upper sidewall (second sidewall) 151 extending in parallel to the axial line 4 of the cylinder bore 14 on the side away from the exhaust opening 16 are formed near the first scavenging opening 17 of the first scavenging passage 110 on the top dead center side of a plane perpendicular to the axial line 4 and passing through a point bisecting the first scavenging opening 17 in the direction of the axial line 4 of the cylinder bore 14. Similarly, a third upper sidewall (first sidewall) 160 extending in parallel to the axial line 4 of the cylinder bore 14 on the side closer to the exhaust opening 16 and a fourth upper sidewall (second sidewall) 161 extending in parallel to the axial line 4 of the cylinder bore 14 on the side away from the exhaust opening 16 are formed near the second scavenging opening 18 of the second scavenging passage 111 on the top dead center side of a point bisecting the second scavenging opening 18 in the direction of the axial line 4 of the cylinder bore 14.

Figure 19:
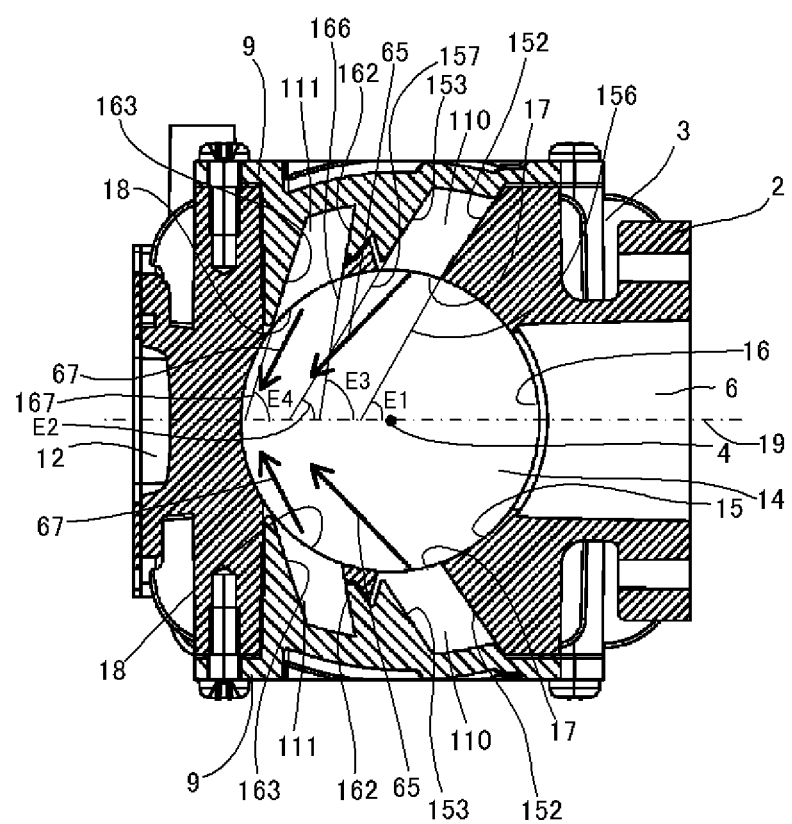
FIG. 19 is a cross-sectional view showing Embodiment 2 of the present invention in accordance with FIG. 13.

Furthermore, as shown in FIGS. 17 and 19, a first lower sidewall (third sidewall) 152 extending in parallel to the axial line 4 of the cylinder bore 14 on the side closer to the exhaust opening 16 and a second lower sidewall (fourth sidewall) 153 extending in parallel to the axial line 4 of the cylinder bore 14 on the side away from the exhaust opening 16 are formed near the first scavenging opening 17 of the first scavenging passage 110 on the bottom dead center side of a plane perpendicular to the axial line 4 and passing through a point bisecting the first scavenging opening 17 in the direction of the axial line 4 of the cylinder bore 14. Similarly, a second lower sidewall (third sidewall) 162 extending in parallel to the axial line 4 of the cylinder bore 14 on the side closer to the exhaust opening 16 and a second lower sidewall (fourth sidewall) 163 extending in parallel to the axial line 4 of the cylinder bore 14 on the side away from the exhaust opening 16 are formed near the second scavenging opening 18 of the second scavenging passage 111 on the bottom dead center side of a point bisecting the second scavenging opening 18 in the direction of the axial line 4 of the cylinder bore 14.

Then, as shown in FIG. 18, when seen in the direction of the axial line of the cylinder bore 14, the extended line (third extended line) 154 extending from the first upper sidewall 150 into the cylinder bore 14 and the extended line (third extended line) 155 extending from the second upper sidewall 151 into the cylinder bore 14 extend away from the exhaust opening 16. Similarly, the extended line (third extended line) 164 extending from the third upper sidewall 160 into the cylinder bore 14 and the extended line (third extended line) 165 extending from the fourth upper sidewall 161 into the cylinder bore 14 extend away from the exhaust opening 16. Furthermore, as shown in FIG. 19, when seen in the direction of the axial line of the cylinder bore 14, the extended line (fourth extended line) 156 extending from the first lower sidewall 152 into the cylinder bore 14 and the extended line (fourth extended line) 157 extending from the second lower sidewall 153 into the cylinder bore 14 extend away from the exhaust opening 16. Similarly, the extended line (fourth extended line) 166 extending from the third lower sidewall 162 into the cylinder bore 14 and the extended line (fourth extended line) 167 extending from the fourth lower sidewall 163 into the cylinder bore 14 extend away from the exhaust opening 16.

Then, in regard to the first scavenging passage 110, the angle D1 (the third angle) between the extended line 154 extending from the first upper sidewall 150 and the line 19 connecting a point bisecting the exhaust opening 16 in the circumferential direction and the axial line 4 of the cylinder bore 14 is larger than the angle E1 (the fourth angle) between the extended line 156 extending from the first lower sidewall 152 and the line 19. In addition, the angle D2 (the third angle) between the extended line 155 extending from the second upper sidewall 161 and the line 19 is larger than the angle E2 (the fourth angle) between the extended line 157 extending from the second lower sidewall 153 and the line 19. Furthermore, in regard to the second scavenging passage 111, the angle D3 (the third angle) between the extended line 164 extending from the third upper sidewall 160 and the line 19 is larger than the angle E3 (the fourth angle) between the extended line 166 extending from the third lower sidewall 162 and the line 19. In addition, the angle D4 (the third angle) between the extended line 165 extending from the fourth upper sidewall 161 and the line 19 is larger than the angle E4 (the fourth angle) between the extended line 167 extending from the fourth lower sidewall 163 and the line 19.

In the engine having the first and second scavenging passages 110 and 111 having the above structure, as shown in FIG. 18, affected by the first and second upper sidewalls 150 and 151, the air-fuel mixture flowing out from the upper part of the first scavenging opening 17 flows into the cylinder bore 14 in the same manner as the flow of air-fuel mixture 64 flowing out from the upper part of the first scavenging opening 17 of the engine of Embodiment 1. Furthermore, affected by the third and fourth upper sidewalls 160 and 161, the air-fuel mixture flowing out from the upper part of the second scavenging opening 18 flows into the cylinder bore 14 in the same manner as the flow of air-fuel mixture 66 flowing out from the upper part of the second scavenging opening 18 of the engine of Embodiment 1. Furthermore, as shown in FIG. 19, affected by the first and second lower sidewalls 152 and 153, the air-fuel mixture flowing out from the lower part of the first scavenging opening 17 flows into the cylinder bore 14 in the same manner as the flow of air-fuel mixture 65 flowing out from the lower part of the first scavenging opening 17 of the engine of Embodiment 1. Furthermore, affected by the third and fourth lower sidewalls 162 and 163, the air-fuel mixture flowing out from the lower part of the second scavenging opening 18 flows into the cylinder bore 14 in the same manner as the flow of air-fuel mixture 67 flowing out from the lower part of the first scavenging opening 18 of the engine of Embodiment 1. Consequently, the same flow of air-fuel mixture as in Embodiment 1 can be formed in the cylinder bore 14 and the same effect as of Embodiment 1 can be obtained.

Here, the boundary between the first upper and lower sidewalls 150 and 152 and the boundary between the second upper and lower sidewalls 151 and 153 does not necessarily coincide with a plane perpendicular to the axial line 4 and passing through a point bisecting the first scavenging opening 17 in the direction of the axial line 4 of the cylinder bore 4. They can be shifted toward the top dead center or toward the bottom dead center. Furthermore, the boundary between the third upper and lower sidewalls 160 and 162 and the boundary between the fourth upper and lower sidewalls 161 and 163 can also be shifted toward the top dead center or toward the bottom dead center from the position coinciding with a plane perpendicular to the axial line 4 and passing through a point bisecting the second scavenging opening 18 in the direction of the axial line 4 of the cylinder bore 4.

In the above embodiments, the engine 1 is mounted on the chain saw 1001. The engine 1 is not necessarily mounted on the chain saw 1001 and can be mounted on an engine tool such as a lawn mower, blower, hedge trimmer, and power generator.

In addition, the material, the shape, the numerical quantity, the disposition and the like of each structural element can be changed and modified as needed as far as the object of the present invention can be accomplished.

Having described and illustrated the principles of this application by reference to one (or more) preferred embodiment(s), it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

This application claims the benefit of Japanese Patent Application No. 2010-084056, filed Mar. 31, 2010, the entire disclosure of which is incorporated by reference herein.

REFERENCE SIGNS LIST

1 Engine
2 Cylinder block
3 crankcase
4 Axis line of the cylinder bore
5 Spark plug
6 Exhaust port
7 Gasket
8 Mounting screw
9 Scavenging passage cover
10 First scavenging passage
11 Second scavenging passage
12 Intake port
13 Crankshaft
14 Cylinder bore
15 Inner peripheral wall
16 Exhaust opening
17 First scavenging opening
18 Second scavenging opening
36 Second upper scavenging passage part
37 Second upper scavenging passage part
42 First upper scavenging passage part
43 First lower scavenging passage part
49 First step
54 Second step

The invention claimed is:

1. A two-cycle engine comprising:
a cylinder block having a cylinder having a top side and a bottom side between which a piston moves, said cylinder having a axial line;
an exhaust opening, a scavenging opening formed on an inner peripheral wall of said cylinder, and an intake opening through which air-fuel mixture is introduced to said cylinder, the said cylinder defining an imaginary plane containing the axial line and passing through the exhaust opening and the intake opening;
a scavenging passage extending in a direction of the axial line of said cylinder and connecting said scavenging opening and a crank chamber communicating with said cylinder, the air-fuel mixture flowing from the crank chamber to the scavenging opening through the scavenging passage, and flowing into the cylinder from of the scavenging opening; and
an outflow direction change device provided in said scavenging passage for creating first and second outflows of the air-fuel mixture flowing out from the scavenging opening into the cylinder, the first outflow of the air-fuel mixture being created on the top side of the cylinder in the scavenging opening and the second outflow of the air-fuel mixture being created on the bottom side of the cylinder in the scavenging opening, the first outflow and the second outflow being in different directions from each other, wherein:
the scavenging passage includes
an upper scavenging passage connected to the scavenging opening and extending in the direction of the axial line, and
a lower scavenging passage having a width larger than a width at a lower end of the upper scavenging passage in a circumferential direction of the cylinder when seen in the direction of the axial line of the cylinder, connected to the lower end of said upper scavenging passage, and extending toward the crank chamber in the direction of the axial line, the lower scavenging passage having an upper portion; and the outflow direction change device is configured to connect the upper scavenging passage to the lower scavenging passage in a manner that the former is shifted with respect to the latter in a direction to an inside of the lower scavenging passage and away from the exhaust opening in the circumferential direction of the cylinder, the upper scavenging passage having a center line shifted to the intake opening with respect to a center line of the lower scavenging passage when seen in a direction perpendicular to the imaginary plane, the outflow direction change device forming a step in the upper portion of the lower scavenging passage on a side close to the exhaust opening where an interior of said scavenging passages is changed stepwise.

2. The two-cycle engine according to claim 1, wherein said outflow direction change device directs the first outflow of the air-fuel mixture flowing out from the top side of the scavenging opening into the cylinder more toward the exhaust opening than the second outflow of the air-fuel mixture flowing out from the bottom side of the scavenging opening into the cylinder when seen in the direction of the axial line of said cylinder.

3. The two-cycle engine according to claim 1, wherein said scavenging opening is a pair of scavenging openings provided nearly symmetrically about a line connecting a point bisecting said exhaust opening in the circumferential direction and the axial line of said cylinder.

4. The two-cycle engine according to claim 1, wherein said scavenging opening is two pairs of scavenging openings provided apart from each other in the circumferential direction of said cylinder nearly symmetrically about a line connecting a point bisecting said exhaust opening in the circumferential direction and the axial line of said cylinder.

5. The two-cycle engine according to claim 1, wherein said scavenging passage has an axial line extending into said cylinder toward an opposite side of said cylinder to said exhaust opening when seen in the direction of the axial line of said cylinder.

6. The two-cycle engine according to claim 1, comprising a scavenging cover provided to said cylinder block for constituting a part of said scavenging passage, wherein said outflow direction change device is partly constituted by said scavenging cover.

7. The two-cycle engine according to claim 6, wherein:
said scavenging passage away from said exhaust opening when seen in the direction of the axial line of said cylinder is formed in a manner that a first extended line extending from a wall surface on the top side of the cylinder in the vicinity of said scavenging opening toward said cylinder extends at a first angle with respect to a plane perpendicular to the axial line of said cylinder so as to approach the top side of the cylinder; and
said scavenging passage closer to said exhaust opening when seen in the direction of the axial line of said cylinder is formed in the manner that a second extended line extending from the wall surface on the top side of the cylinder in the vicinity of said scavenging opening toward said cylinder extends at a second angle smaller than the first angle with respect to a plane perpendicular to the axial line of said cylinder.

8. The two-cycle engine according to claim 1, wherein an inner wall of said upper scavenging passage on a side away from said exhaust opening in the circumferential direction of said cylinder and an inner wall of said lower scavenging passage on the side away from said exhaust opening in the circumferential direction of said cylinder are connected in an overlapping manner when seen in the direction of the axial line of said cylinder.

9. The two-cycle engine according to claim 1, wherein:
a channel cross-sectional area of said upper scavenging passage near a connection point to said lower scavenging passage is smaller than a channel cross-sectional area of said lower scavenging passage near a connection point to said upper scavenging passage; and
a channel cross-sectional area of said upper scavenging passage near said scavenging opening is smaller than a channel cross-sectional area of said upper scavenging passage near the connection point to said lower scavenging passage.

10. The two-cycle engine according to claim 1, wherein said upper and lower scavenging passages have nearly the same length in the direction of the axial line of said cylinder.

11. The two-cycle engine according to claim 1, wherein said outflow direction change device forms a flow of the air-fuel mixture directed toward said exhaust opening near the top side of the cylinder in the vicinity of said scavenging opening and a flow of air-fuel mixture directed away from said exhaust opening near the bottom side of the cylinder of said scavenging passage in the vicinity of said scavenging opening.

12. The two-cycle engine according to claim 1, wherein said outflow direction change device comprises:
a first sidewall and a second sidewall extending in the direction of the axial line of said cylinder on the top side of the cylinder in the vicinity of said scavenging opening and situated on a side closer to said exhaust opening and on a side away from said exhaust opening, respectively; and
a third sidewall and fourth sidewall extending in the direction of the axial line of said cylinder on the bottom side of the cylinder in the vicinity of said scavenging opening and situated on the side closer to said exhaust opening and on the side away from said exhaust opening, respectively,
when seen in the direction of the axial line of said cylinder, a third extended line extending from said first sidewall or second sidewall into said cylinder extends away from said exhaust opening and a fourth extended line extending from said third sidewall or fourth sidewall into said cylinder extends away from said exhaust opening, and
said first, second, third, and fourth sidewalls are formed in the manner that a third angle between said third extended line and the line connecting a point bisecting said exhaust opening in the circumferential direction and the axial line of said cylinder is larger than a fourth angle between said fourth extended line and a line connecting a point bisecting said exhaust opening in the circumferential direction and the axial line of said cylinder.

13. The two-cycle engine according to claim 12, wherein when seen in the direction of the axial line of said cylinder, a lower end of said first and second sidewalls and an upper end of said third and fourth sidewalls are each situated nearly at a midpoint of said scavenging opening.

14. A two-cycle engine comprising:
a cylinder block having a cylinder;
an exhaust opening and a scavenging opening formed on an inner peripheral wall of said cylinder; and
a scavenging passage extending in a direction of an axial line of said cylinder, connecting said scavenging opening and a crank chamber communicating with said cylinder, and having an upper scavenging passage part connected to said scavenging opening and extending in a direction from a top dead center to a bottom dead center and a lower scavenging passage part having a width larger than a width at a lower end of said upper scavenging passage part in a circumferential direction of said cylinder when seen in the direction of the axial line of said cylinder, connected to the lower end of said upper scavenging passage part, and extending toward said crank chamber, wherein said upper scavenging passage part is connected to said lower scavenging passage part in an offset manner in a direction away from said exhaust opening in the circumferential direction of said cylinder.

15. An engine tool comprising the two-cycle engine according to claim 1.

\* \* \* \* \*